(12) United States Patent
Kim (10) Patent No.: US 8,958,268 B2
(45) Date of Patent: Feb. 17, 2015

(54) USER-INTERFACE TARGET MOTION ANALYSIS METHOD USING TWO-DIMENSIONAL PARAMETER CONTROL AND SPEED ZOOM

(71) Applicant: Agency for Defense Development, Daejeon (KR)

(72) Inventor: In Soo Kim, Seoul (KR)

(73) Assignee: Agency for Defense Development, Daejeon (KR)

( * ) Notice: Subject to any disclaimer, the term of this patent is extended or adjusted under 35 U.S.C. 154(b) by 148 days.

(21) Appl. No.: 13/734,435

(22) Filed: Jan. 4, 2013

(65) Prior Publication Data
US 2014/0140177 A1 May 22, 2014

(30) Foreign Application Priority Data
Jan. 6, 2012 (KR) .................. 10-2012-0001974

(51) Int. Cl.
*G01S 7/00* (2006.01)
*G01S 5/18* (2006.01)
*G01S 15/66* (2006.01)

(52) U.S. Cl.
CPC .. *G01S 5/18* (2013.01); *G01S 15/66* (2013.01)
USPC ........................... 367/128; 367/129

(58) Field of Classification Search
CPC .................................. G01S 15/66; G01S 5/18
USPC .................................. 367/128, 129
See application file for complete search history.

(56) References Cited

U.S. PATENT DOCUMENTS

| 7,020,046 | B1 * | 3/2006 | Baylog et al. ................. 367/124 |
| 7,627,424 | B1 * | 12/2009 | Gibbs et al. .................... 701/519 |
| RE42,546 | E * | 7/2011 | Bulow et al. ..................... 701/21 |
| 2002/0097635 | A1 * | 7/2002 | LaRosa et al. ................ 367/130 |
| 2004/0090864 | A1 * | 5/2004 | Larosa et al. ................ 367/124 |
| 2005/0041102 | A1 * | 2/2005 | Bongiovanni et al. ........ 348/155 |

OTHER PUBLICATIONS

Daniel H. Wagner, W.Charles Mylander, and Thomas J. Sanders, Naval Operations Analysis, Third Edition, Naval Institute Press, pp. 256-275, 1999.
Yaakov Bar-Shalom and Xiao-Rong Li, Estimation and Tracking: Principles, Techniques, and Software, Artech House, pp. 164-177, 1993.
Steven C. Nardone and Vincent J. Aidala, Observability Criteria for Bearings-Only Target Motion Analysis, IEEE Transactions on Aerospace and Electronic Systems, vol. 17, No. 2, pp. 162-166, Mar. 1981.

(Continued)

*Primary Examiner* — Isam Alsomiri
*Assistant Examiner* — Hovhannes Baghdasaryan
(74) *Attorney, Agent, or Firm* — Pearne & Gordon LLP (57) ABSTRACT

Disclosed is a user-interface target motion analysis (TMA) method using two-dimensional parameter control and speed zoom, and the method includes a first step of displaying a user-interface target motion analysis screen capable of selecting an input method; a second step of receiving the input method of a user; a third step of simultaneously calculating a speed and a course by speed zoom or simultaneously calculating a course and an initial range; a fourth step of calculating an initial range or a speed by speed zoom that is not calculated in the third step; and a step of generating a result of the target motion analysis using the parameters inputted through the first to fourth steps.

7 Claims, 9 Drawing Sheets

(56) References Cited

OTHER PUBLICATIONS

Steven C. Nardone, Allen G. Lindgren, and Kai F. Gong, Fundamental Properties and Performance of Conventional Bearings-Only Target Motion Analysis, IEEE Transactions on Automatic Control, vol. 29, No. 9, pp. 775-787, Sep. 1984.

In Soo Kim, Measurements Preprocessing for Bearing and Frequency Target Motion Analysis, Journal of the Korea Institute of Military Science and Technology, vol. 7, No. 2, pp. 22-31, Jun. 2004.
In Soo Kim, et al., A Study on Frequency Doppler Compensation of Target Motion Analysis for Passive SONAR, Aug. 2009.

* cited by examiner

USER-INTERFACE TARGET MOTION ANALYSIS METHOD USING TWO-DIMENSIONAL PARAMETER CONTROL AND SPEED ZOOM

BACKGROUND OF THE INVENTION

1. Field of the Invention

The present invention relates to a user-interface target motion analysis system of a passive sonar system, and more particularly, to a user-interface target motion analysis method and a target motion analysis system of a passive sonar system, which can simultaneously input two parameter values.

2. Background of the Related Art

A SONAR (sound navigation and ranging) system is an apparatus for estimating an bearing and a range of a target moving underwater, using sound waves. Generally, the sound waves are used as a means for detecting submarine targets moving underwater. Although the sound waves have a characteristic of a slow propagation speed, they may detect the targets from a long range since their wavelengths are longer than those of radio waves. Therefore, the sonar systems are used for military purposes to detect underwater targets using the means of sound waves.

The sonar systems are divided into passive types and active types. Those are, the sonar systems may be divided into the passive type sonar systems which detect noises radiated from a target and the active type sonar systems which radiate sound wave pulses and detect returning echoes reflected from the target. Although the passive type sonar systems are disadvantageous in that complex sound sensors are required and a long time is taken to measure a range to the target, they can secretly detect the target and have a long detection range compared to the active sonar systems. On the other hand, although the active sonar systems may neither secretly detect the target nor have a long detection range, but they can simultaneously detect both an bearing and a range to the target in a short time.

The target motion analysis method of a passive sonar system includes automated target motion analysis method for estimating a range, a speed and a course of a target from a target tracking bearing or a target tracking frequency using a filtering algorithm and user-interface (or manual) target motion analysis method for finding an initial range, a speed and a course which minimize bearing errors between an estimated target bearing calculated from the initial range, the speed and the course estimated by a user and a target tracking bearing detected and tracked by a sensor.

The user-interface target motion analysis method is an interactive method for inputting a three-dimensional parameter of an initial range, a speed and a course and calculating an estimated target bearing until a minimum bearing error is obtained while the user observes tendency of bearing errors, which is an indispensable method in the passive sonar target motion analysis system. As a method of inputting the initial range, the speed and the course in user-interface target motion analysis systems which are developed and operated, there is a slide button input method for inputting three values and calculating an estimated target bearing by handling buttons respectively corresponding to the initial range, the speed and the course by the user, and there is a keyboard input method for directly inputting values of an initial range, a speed and a course by the user and calculating an estimated target bearing.

In the case of the conventional slide button input method or the keyboard input method, the user should input the values by handling the slide buttons or using a keyboard for the three-dimensional parameter of an initial range, a speed and a course until the bearing error is minimized. In these methods, since even a skilled user should handle the three-dimensional parameter until an optimum target motion analysis result is obtained, a long operating time is required, and efficiency of the analysis is lowered.

Results of searching for domestic and international patents related to the target motion analysis of the present invention are shown in table 1 (searched sites: US Patent and Trademark Office, European Patent Office, and Korea Institute of Patent Information, and there is no domestic or international patent corresponding or similar to the present invention.

TABLE 1

| Patent No. (Nation of Patent) | Title of patent |
| --- | --- |
| US 2005/0041102 A1(US) | Automatic target detection and motion analysis from image data |
| U.S. Pat. No. 7,020,046 B1(US) | System and method for target motion analysis with intelligent parameter evaluation plot |
| US 2004/0090864 A1(US) | Raster based system and method for target tracking and motion analysis |
| 5,877,998(US) | Recursive method for target motion analysis |
| 5,732,043(US) | Optimized deterministic bearings only target motion analysis technique |
| 5,696,700(US) | System and computer-implemented method for fractal-dimension measurement for target motion analysis noise discrimination |
| 5,469,374(US) | Automatic data segmentation module for target motion analysis applications |
| US 2002/0097635 A1(US) | Method for target tracking and motion analysis |

Figure 1:
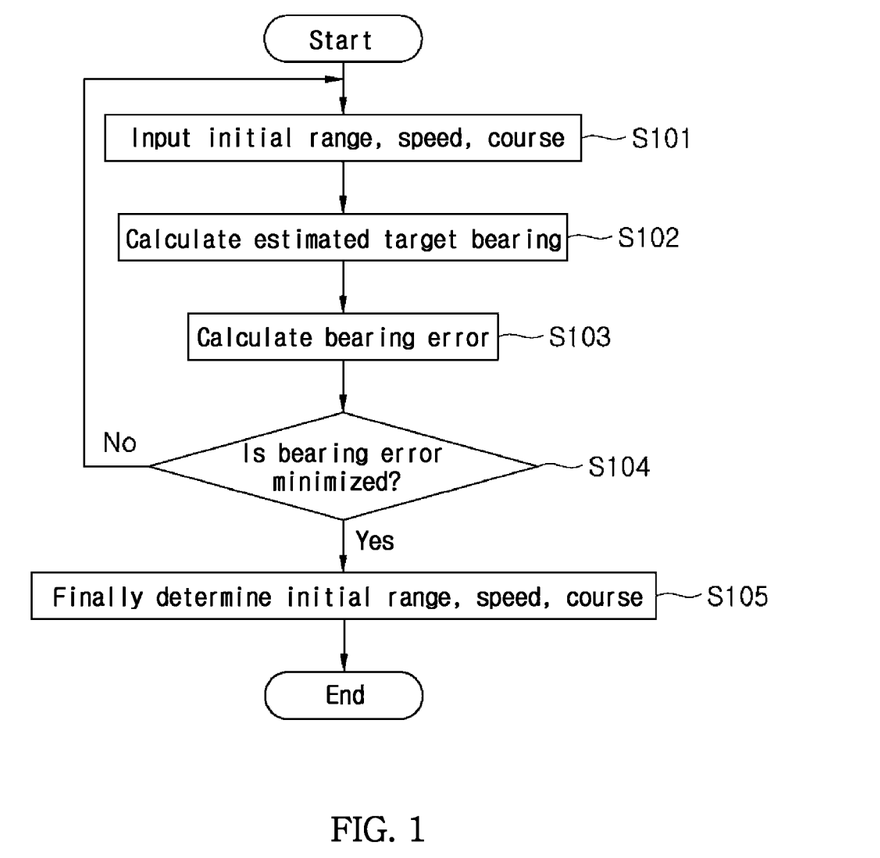
FIG. 1 is a flowchart illustrating the processing procedure of a user-interface target motion analysis system according to a conventional technique.

The user-interface target motion analysis method is as shown in FIG. 1. An initial range value $R^o_{est}$ (hereinafter, referred to as an "initial range"), a speed value $V_{est}$ (hereinafter, referred to as a "speed"), and a course value $C_{est}$ (hereinafter, referred to as a "course") are respectively inputted S101, and an estimated target bearing $\theta^i_{est}$ is calculated as shown below S102.

$$\theta^i_{est} = f(R^o_{est}, V_{est}, C_{est}), i=1,2,\ldots N$$

An bearing error $\theta^i_{err}$ between the estimated target bearing $\theta^i_{est}$ and a target tracking bearing $\theta^i_{tra}$ tracked and detected by a sensor is calculated as shown below S103.

$$\theta^i_{err} = \theta^i_{est} - \theta^i_{tra}, i=1,2,\ldots N$$

It is determined whether or not the bearing error $\theta^i_{err}$ is minimized S104, and if the bearing error $\theta^i_{err}$ is minimized, the initial range $R^o_{est}$, the speed $V_{est}$ and the course $C_{est}$ are finally determined, and the target motion analysis is terminated S105.

As is understood from FIG. 1, the user should input values of the initial range $R^o_{est}$, the speed $V_{est}$ and the course $C_{est}$ until the bearing error is minimized in the user-interface target motion analysis method.

The method of inputting the initial range $R^o_{est}$, the speed $V_{est}$ and the course $C_{est}$ in the conventional user-interface target motion analysis method includes a keyboard input method for sequentially inputting the initial range $R^o_{est}$, the speed $V_{est}$ and the course $C_{est}$ by the user using a keyboard and a slide button input method for sequentially inputting the initial range $R^o_{est}$, the speed $V_{est}$ and the course $C_{est}$ by handling slide buttons corresponding to the initial range, the speed and the course using a mouse or the like.

The keyboard input method is configured to input the initial range $R^o_{est}$, the speed $V_{est}$ and the course $C_{est}$ by the user using key buttons, and the slide button input method is configured to input the initial range $R^0{}_{est}$, the speed $V_{est}$ and the course $C_{est}$ using slide buttons.

If the initial range $R^0{}_{est}$, the speed $V_{est}$ and the course $C_{est}$ are inputted respectively, an estimated target bearing $\theta^i{}_{est}$ and a target motion line are calculated, and an bearing error $\theta^i{}_{err}$ between the estimated target bearing and the target tracking bearing tracked and detected by the sensor is calculated. The initial range, the speed and the course are inputted until the bearing error $\theta^i{}_{err}$ is minimized.

The initial range, the speed and the course are finally determined if the bearing error $\theta^i{}_{err}$ is minimized.

Although the slide button input method is convenient compared to the keyboard input method in that the initial range $R^0{}_{est}$, the speed $V_{est}$ and the course $C_{est}$ can be inputted by the amount of increase or decrease, both of the two methods are inconvenient in that all three parameters of the initial range $R^0{}_{est}$, the speed $V_{est}$ and the course $C_{est}$ should be inputted individually.

SUMMARY OF THE INVENTION

Therefore, the present invention has been made in view of the above problem of individually handling three parameters, and it is an object of the present invention to provide a user-interface target motion analysis method and a user-interface target motion analysis system using two-dimensional parameter control, which can reduce operating time.

Another object of the present invention is to provide a user-interface target motion analysis method and a user-interface target motion analysis system using two-dimensional parameter control, which can efficiently obtain an optimum result of target motion analysis.

To accomplish the above object, according to one aspect of the present invention, there is provided a user-interface target motion analysis method and a user-interface target motion analysis system using two-dimensional parameter control, in which values of an initial range, a speed and a course are inputted by handling two parameters among the initial range, the speed and the course using information on the position of a cursor in the Cartesian coordinate system or the polar coordinate system.

The user-interface target motion analysis method using two-dimensional parameter control according to the present invention includes: (a1) a first step of displaying a user-interface target motion analysis (TMA) screen capable of selecting an input method; (a2) a second step of receiving an input method selection signal of a user; (a3) a third step of precisely calculating a speed and a course by controlling resolution of speed and course through speed zooming based on the selected input method, and recognizing and storing the speed and the course as input values; (a4) a fourth step of simultaneously calculating at least two parameters among parameter values including an initial range, a speed and a course based on the selected input method, and recognizing and storing the parameters as input values; (a5) a fifth step of calculating other parameter values that are not calculated in the fourth step, and recognizing and storing the other parameters as input values; and (a6) a sixth step of generating a result of the target motion analysis using the parameters inputted through the third to fifth steps.

In the user-interface target motion analysis method using two-dimensional parameter control according to the present invention, the input method selection signal is generated using a pointing device.

In the user-interface target motion analysis method using two-dimensional parameter control according to the present invention, the input method selection signal is generated using a display device which applies a touch panel.

In the user-interface target motion analysis method using two-dimensional parameter control according to the present invention, the input method selection signal is generated by selecting any one of (b) a method of zooming speed, (c) a method of simultaneously calculating a speed and a course through speed zooming, (d) a method of simultaneously calculating a course and an initial range and calculating a speed through speed zooming and (e) a method of simultaneously calculating an initial range and speed.

In the user-interface target motion analysis method using two-dimensional parameter control according to the present invention, method (b) of zooming speed includes the steps of: (b1) acquiring an increase or decrease amount (an increase value or a decrease value) of a wheel operated by user's handling; (b2) calculating a speed control coefficient from the increase or decrease amount of the wheel; (b3) updating the speed using the speed control coefficient, coordinates of a cursor position, and coordinates of the initial range; (b4) updating a target motion line using the updated speed, the coordinates of the cursor position, and the coordinates of the initial range; and (b5) determining whether or not speed update is additionally required.

In the user-interface target motion analysis method using two-dimensional parameter control according to the present invention, method (c) of simultaneously calculating a speed and a course through speed zooming includes the steps of: (c1) acquiring coordinates of a current position of a cursor operated by user's handling; (c2) acquiring an increase or decrease amount (an increase value or a decrease value) of a wheel operated by user's handling; (c3) calculating a speed control coefficient from the increase or decrease amount of the wheel; (c4) updating the speed using the speed control coefficient, the coordinates of the cursor position, and the coordinates of the initial range; (c5) updating a target motion line using the updated speed, the coordinates of the cursor position, and the coordinates of the initial range; (c6) determining whether or not speed update is additionally required; (c7) simultaneously calculating expected speed and course of a target by calculating a range and an angle from the coordinates of the current cursor position and the coordinates of the initial range of the target based on newly updated resolution of speed and course; (c8) updating the target motion line using the calculated speed and course; and (c9) calculating the initial range using the coordinates of the new cursor position and the target motion line.

In the user-interface target motion analysis method using two-dimensional parameter control according to the present invention, step (c9) of calculating the initial range includes the steps of: (c9-1) calculating the coordinates of the initial range from the coordinates of the new cursor position and the target motion line; (c9-2) updating the target motion line using the coordinates of the cursor position and the coordinates of the initial range; and (c9-3) storing the initial range calculated from the coordinates of the cursor position.

In the user-interface target motion analysis method using two-dimensional parameter control according to the present invention, method (d) of simultaneously calculating a course and an initial range and calculating a speed through speed zooming includes the steps of: (d1) acquiring coordinates of a current position of a cursor operated by user's handling; (d2) converting control variations of the course and the initial range using a relation between a moving direction of the cursor operated by user's handling and an bearing line; (d3) simultaneously calculating the course and the initial range from the control variations of the course and the initial range;

(d4) updating a target motion line using the calculated course and initial range; (d5) acquiring an increase or decrease amount (an increase value or a decrease value) of a wheel operated by user's handling; (d6) calculating a speed control coefficient from the increase or decrease amount of the wheel; (d7) updating the speed using the speed control coefficient, the coordinates of the cursor position, and coordinates of the initial range; (d8) updating the target motion line using the updated speed, the coordinates of the cursor position, and the coordinates of the initial range; (d9) determining whether or not speed update is additionally required; and (d10) calculating an expected speed of a target by calculating a range from the coordinates of the current cursor position and the coordinates of the initial range of the target based on newly updated resolution of speed.

In the user-interface target motion analysis method using two-dimensional parameter control according to the present invention, method (e) of simultaneously calculating an initial range and a speed includes the steps of: (e1) acquiring coordinates of a current position of a cursor operated by user's handling; (e2) simultaneously calculating the initial range and the speed using X-axis and Y-axis coordinate values of the coordinates of the current cursor position; (e3) updating a target motion line using the calculated initial range and speed; and (e4) calculating the course using coordinates of a new cursor position and the target motion line.

In the user-interface target motion analysis method using two-dimensional parameter control according to the present invention, step (e4) of calculating a course includes the steps of: (e4-1) acquiring X-axis and Y-axis coordinate values of the coordinates of the new cursor position; and (e4-2) calculating the course using the coordinates of the cursor position and the coordinates of the initial range.

In the user-interface target motion analysis method using two-dimensional parameter control according to the present invention, the third step precisely calculates the speed and the course by controlling the resolution of speed and course through speed zooming using wheel information.

In the user-interface target motion analysis method using two-dimensional parameter control according to the present invention, the fourth step simultaneously calculates the speed and the course through speed zooming using information on a cursor position and a wheel, simultaneously calculates the course and the initial range from a relation between a moving direction of the cursor operated by user's handling and an bearing line or simultaneously calculates the initial range and the speed. In the user-interface target motion analysis method using two-dimensional parameter control according to the present invention, information on a cursor position may be x and y values in a Cartesian coordinate system or r and θ values in a polar coordinate system.

The user-interface target motion analysis system using two-dimensional parameter control according to the present invention includes: a display device for displaying a user-interface target motion analysis (TMA) screen capable of selecting an input method from a plurality of input methods for simultaneously inputting two parameters; an input device for inputting a user's selection signal for the input method; a sensor for detecting and tracking an bearing of a target; and a processor for controlling to perform target motion analysis in response to the selection signal inputted through the input device and display a signal provided by the sensor on the display device.

In the user-interface target motion analysis system using two-dimensional parameter control according to the present invention, the user's selection signal for the input method is generated by selecting any one of a method of zooming speed, a method of simultaneously calculating a speed and a course through speed zooming, a method of simultaneously calculating a course and an initial range and calculating a speed through speed zooming, and a method of simultaneously calculating an initial range and a speed.

In the user-interface target motion analysis system using two-dimensional parameter control according to the present invention, the input device is a pointing device such as a mouse, a track ball, or a joy stick.

In the user-interface target motion analysis system using two-dimensional parameter control according to the present invention, the input device is a touch panel.

| DESCRIPTION OF THE SYMBOLS | |
|---|---|
| 10: Input device | 20: Sensor |
| 30: Microprocessor | 40: Display device |

DETAILED DESCRIPTION OF THE PREFERRED EMBODIMENT

Figure 2:
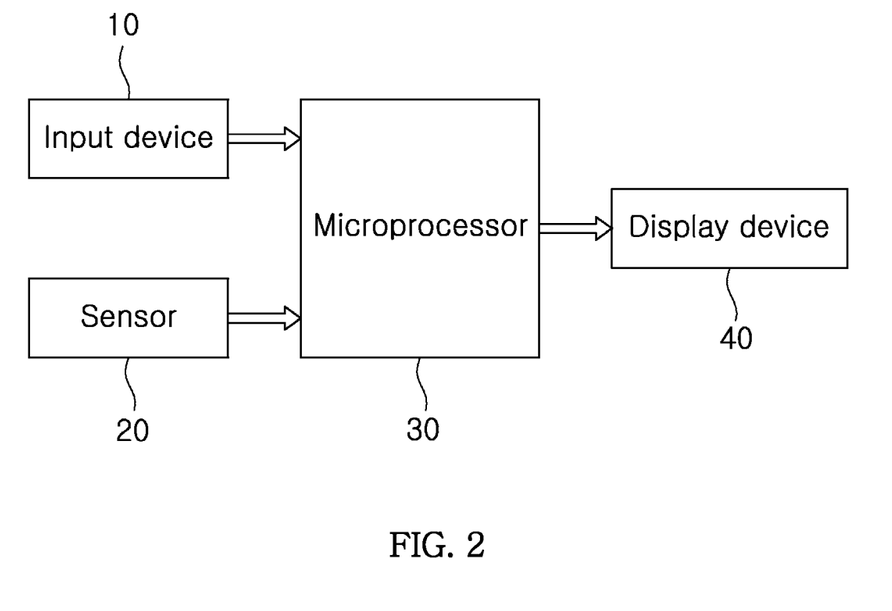
FIG. 2 is a block diagram schematically showing the configuration of a user-interface target motion analysis system according to the present invention.

FIG. 2 is a block diagram schematically showing the configuration of a user-interface target motion analysis system according to the present invention. Observing the configuration, the user-interface target motion analysis system includes a display device 40 for displaying a user-interface target motion analysis (TMA) screen capable of selecting an input method from a plurality of input methods for simultaneously inputting two parameters, an input device 10 for inputting a user's selection signal for the input method and a signal corresponding to handling of the user, a sensor 20 for detecting and tracking an bearing of a target, and a processor 30 for controlling to perform target motion analysis in response to the selection signal inputted through the input device 10 and display a signal provided by the sensor 20 on the display device.

The input device 10 may be largely divided into the types of a pointing device and a touch panel, and any one of a mouse, a joy stick and a track ball may be used as the pointing device.

Figure 3:
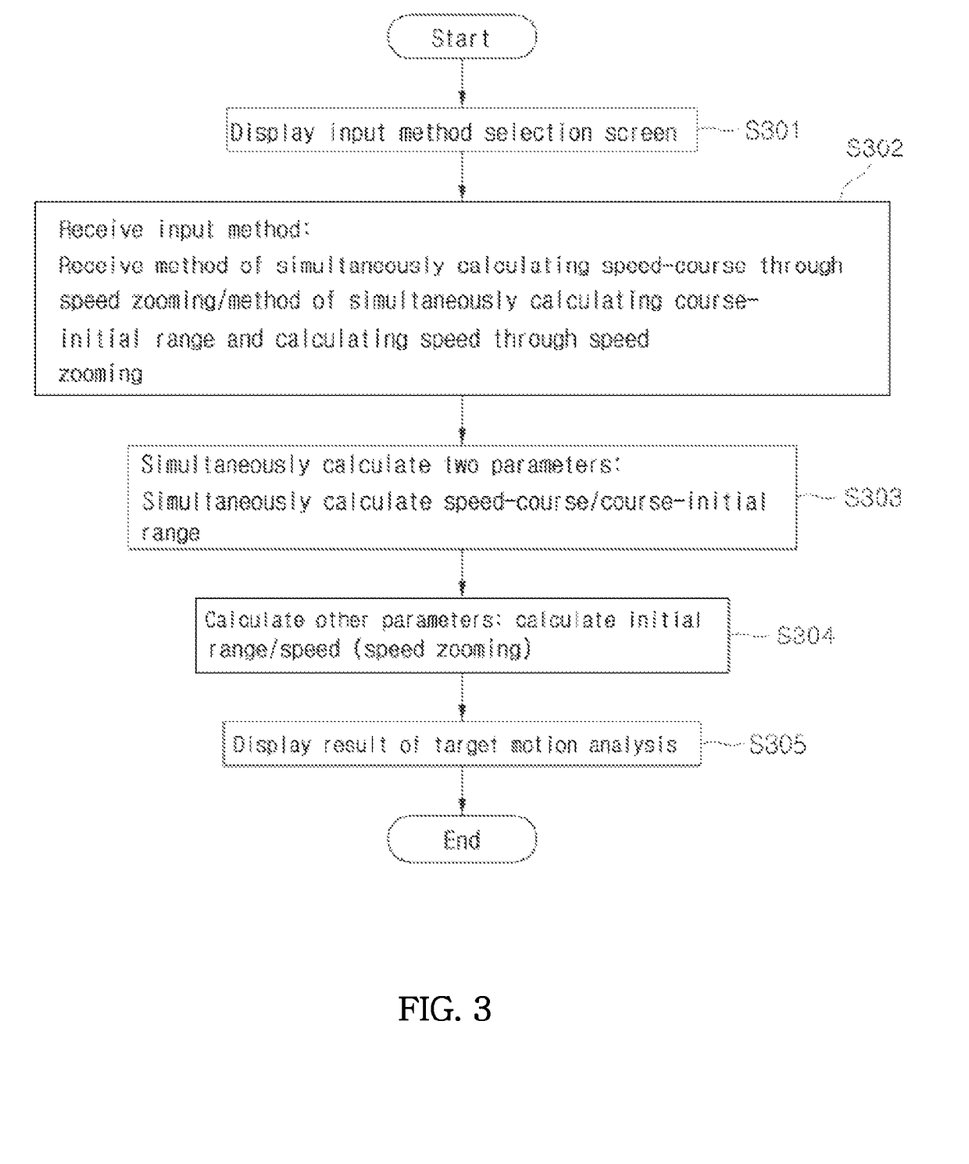
FIG. 3 is a flowchart illustrating the processing procedure of a user-interface target motion analysis system according to the present invention.

FIG. 3 is a flowchart illustrating the processing procedure of a user-interface target motion analysis system according to the present invention.

The user-interface target motion analysis method includes (a1) a first step of displaying a user-interface target motion analysis (TMA) screen capable of selecting an input method; (a2) a second step of receiving an input method selection signal of a user; (a3) a third step of precisely calculating a speed and a course by controlling resolution of speed and course through speed zooming based on the selected input method, and recognizing and storing the speed and the course as input values; (a4) a fourth step of simultaneously calculating at least two parameters among parameter values including an initial range, a speed and a course based on the selected input method, and recognizing and storing the parameters as input values; (a5) a fifth step of calculating other parameter values that are not calculated in the fourth step, and recognizing and storing the other parameters as input values; and (a6) a sixth step of generating a result of the target motion analysis using the parameters inputted through the third to fifth steps.

The third step precisely calculates the speed and the course by controlling the resolution of speed and course through speed zooming using wheel information.

The fourth step simultaneously calculates the speed and the course through speed zooming using information on the cursor position and the wheel, simultaneously calculates the course and the initial range from the relation between the moving direction of the cursor operated by user's handling and an bearing line, or simultaneously calculates the initial range and the speed.

The information on the cursor position may be x and y values in the Cartesian coordinate system or r and θ values in the polar coordinate system.

Describing in further detail, if the user drives the target motion analysis system, the user-interface target motion analysis screen capable of selecting an input method is displayed on a display device. At this point, a selection check field is displayed on the screen so that any one of three methods may be selected S301. A selection signal of the user for the input method may be generated by selecting any one of (b) a method of zooming speed, (c) a method of simultaneously calculating a speed and a course through speed zooming, (d) a method of simultaneously calculating a course and an initial range and calculating a speed through speed zooming, and (e) a method of simultaneously calculating an initial range and a speed.

In order to perform the user-interface target motion analysis, the user should input an initial range, a speed, and a course. Any one of a method of simultaneously inputting a speed and a course through speed zooming, a method of simultaneously inputting a course and an initial range, and a method of simultaneously inputting an initial range and a speed should be selected as a method of inputting an initial range, a speed and a course in order to perform the target motion analysis using the present invention. The user selects an input method using a pointing device such as a mouse, a joy stick, a track ball or the like, or using a stylus pen or directly touching a user's finger onto the screen if the screen is configured with a touch panel, and a selection signal is transferred to the microprocessor of the target motion analysis system S302.

At least two parameters among parameter values including the initial range, the speed and the course are simultaneously calculated based on the selected input method, and recognized and stored as input values S303.

Subsequently, other parameter values that are not calculated in the above step are calculated, recognized and stored as input values S304.

A step of generating a result of the target motion analysis using the parameters inputted through the steps of S303 and S304 is performed S305.

As described above, the target motion analysis system and the target motion analysis method according to the present invention largely have four types of input methods. That is, although three parameters of an initial range, a speed and a course are inputted, it is not that they are individually inputted like in a conventional technique, but that two parameters are simultaneously inputted in one operation and then the other parameter value is inputted. At this point, the method of inputting two parameters may include a method of zooming speed, a method of simultaneously inputting a speed and a course through speed zooming, a method of simultaneously inputting a course and an initial range, and a method of simultaneously inputting an initial range and a speed.

Figure 4:
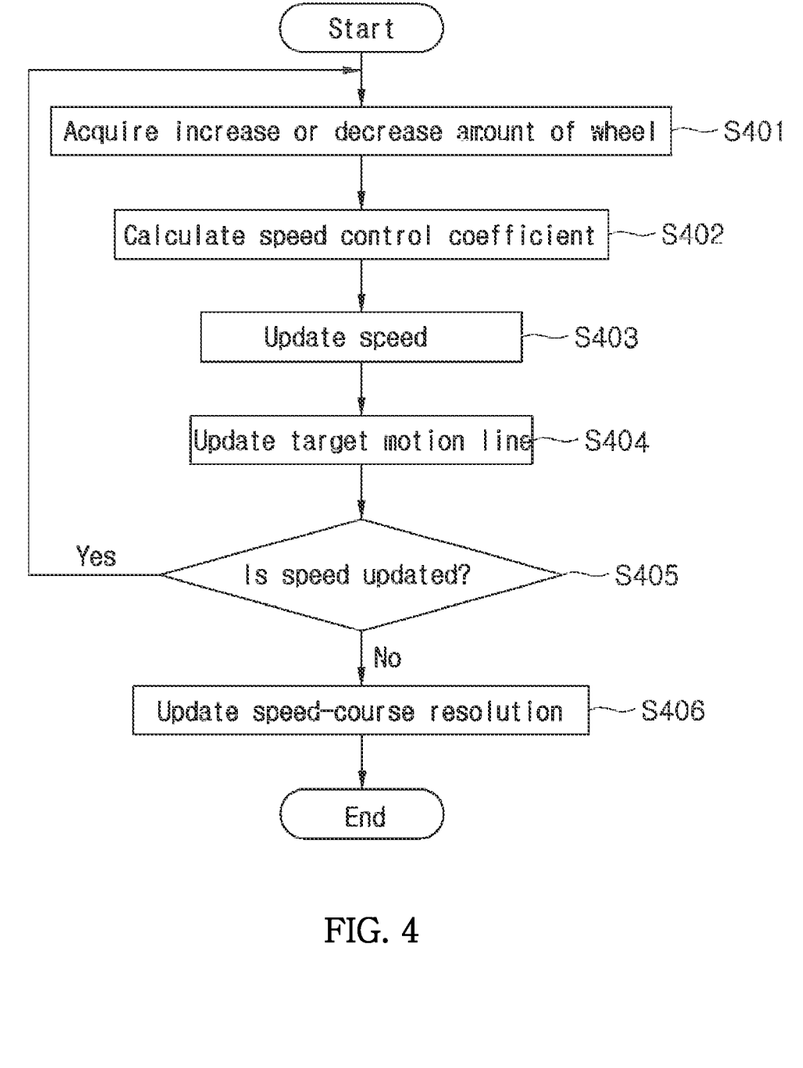
FIG. 4 is a flowchart illustrating the procedure of controlling resolution of speed and course through speed zooming according to the present invention.

First, the method of zooming speed is processed as shown in FIG. 4.

Method (b) of zooming speed includes the steps of (b1) acquiring an increase or decrease amount (an increase value or a decrease value) of the wheel operated by user's handling; (b2) calculating a speed control coefficient from the increase or decrease amount of the wheel; (b3) updating the speed using the speed control coefficient, the coordinates of a cursor position, and the coordinates of the initial range; (b4) updating a target motion line using the updated speed, the coordinates of the cursor position, and the coordinates of the initial range; and (b5) determining whether or not speed update is additionally required.

The user acquires an increase or decrease amount (an increase value or a decrease value) of a wheel $\Delta_w$ while moving the wheel on the display screen using a pointing device such as a mouse or a track ball S401.

A speed control coefficient $C_v$ is calculated from the increase or decrease amount of the wheel $\Delta_w$ S402.

$$C_v = C_v + \Delta_w$$

The speed $V_c$ at the current cursor position is updated using the speed control coefficient $C_v$ calculated from the increase or decrease amount of the wheel $\Delta_w$, the coordinates of the cursor position $X_c$ and $Y_c$, and the coordinates of the initial range $X_b$ and $Y_b$ S403.

$$V_c = \frac{V_c}{C_v}$$

$$V_c = \sqrt{(X_c - X_b)^2 + (Y_c - Y_b)^2}$$

The target motion line is updated using the newly updated speed $V_n$, the coordinates of the cursor position $X_c$ and $Y_c$, and the coordinates of the initial range $X_b$ and $Y_b$ S404.

It is determined whether or not speed update is additionally required S405.

If the pointing device is controlled at the current cursor position using the newly updated speed $V_n$, there is an effect of updating resolution of speed and course S406.

Figure 5:
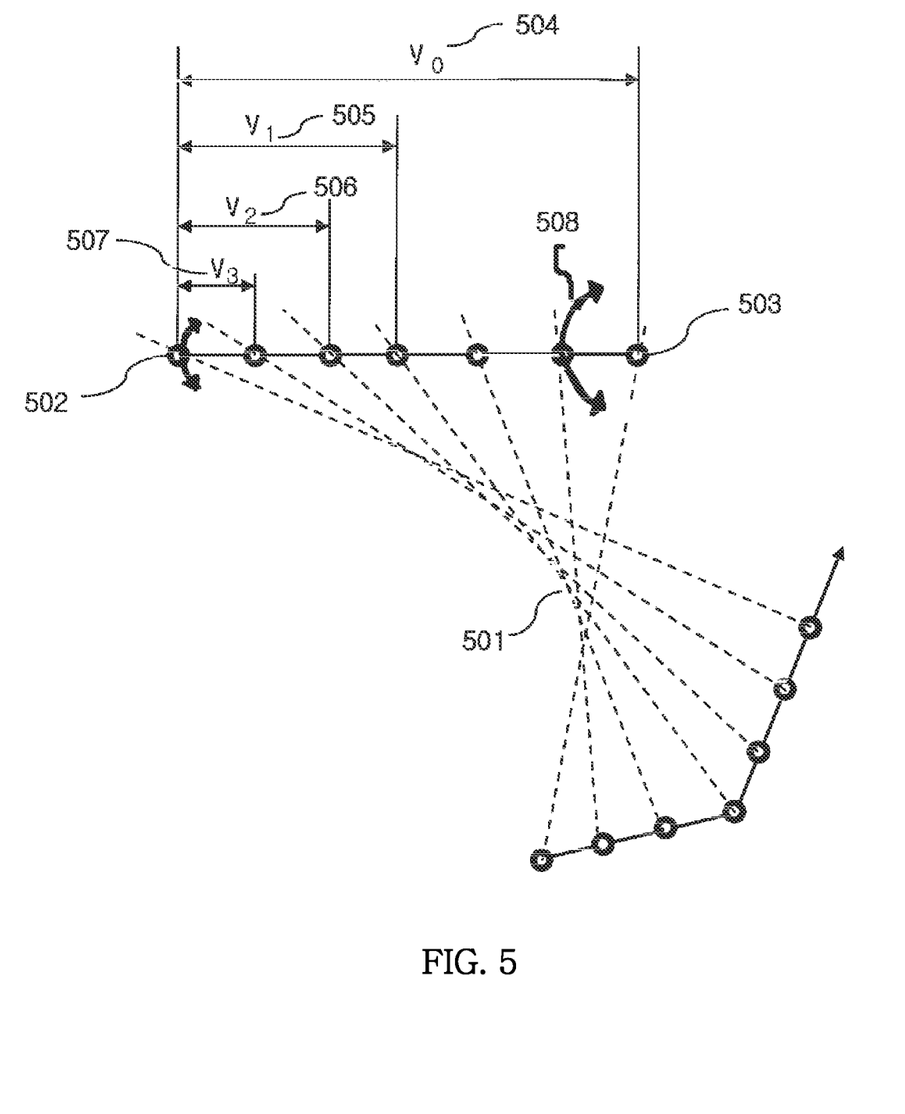
FIG. 5 is a view showing the concept of speed zooming.

FIG. 5 is a conceptual view showing a method of precisely inputting a speed and a course through speed zooming.

A speed $V_0$ 504 at the current cursor position is calculated using the current cursor position 502 and the initial range position 503 for a series of bearing lines 501. The speed is updated to $V_1$, $V_2$ and $V_3$ 505, 506 and 507 respectively at the current cursor position 502 through speed zooming. If the cursor is moved from the current cursor position 502 after the speed finally is updated to $V_3$, the speed may be precisely controlled and calculated with respect to $V_3$, and the course may be controlled and calculated as precisely as the range between the current cursor position and the initial range position 503. In order to precisely control and calculate the speed with respect to $V_3$ in practice, the cursor should be positioned at a position 508 corresponding to speed $V_3$, and in this case, although the cursor moves only slightly, the speed changes greatly. It is the same for the course, and in this case, variation of the course is very high although the cursor moves only slightly. When the cursor is controlled at the current cursor position 502, the course and the speed may be precisely controlled if the cursor moves only slightly, compared with the position 508 corresponding to the speed $V_3$. As a result, the speed and the course may be precisely controlled and calculated at the current cursor position 502 without enlarging the display screen in software through speed zooming.

Figure 6:
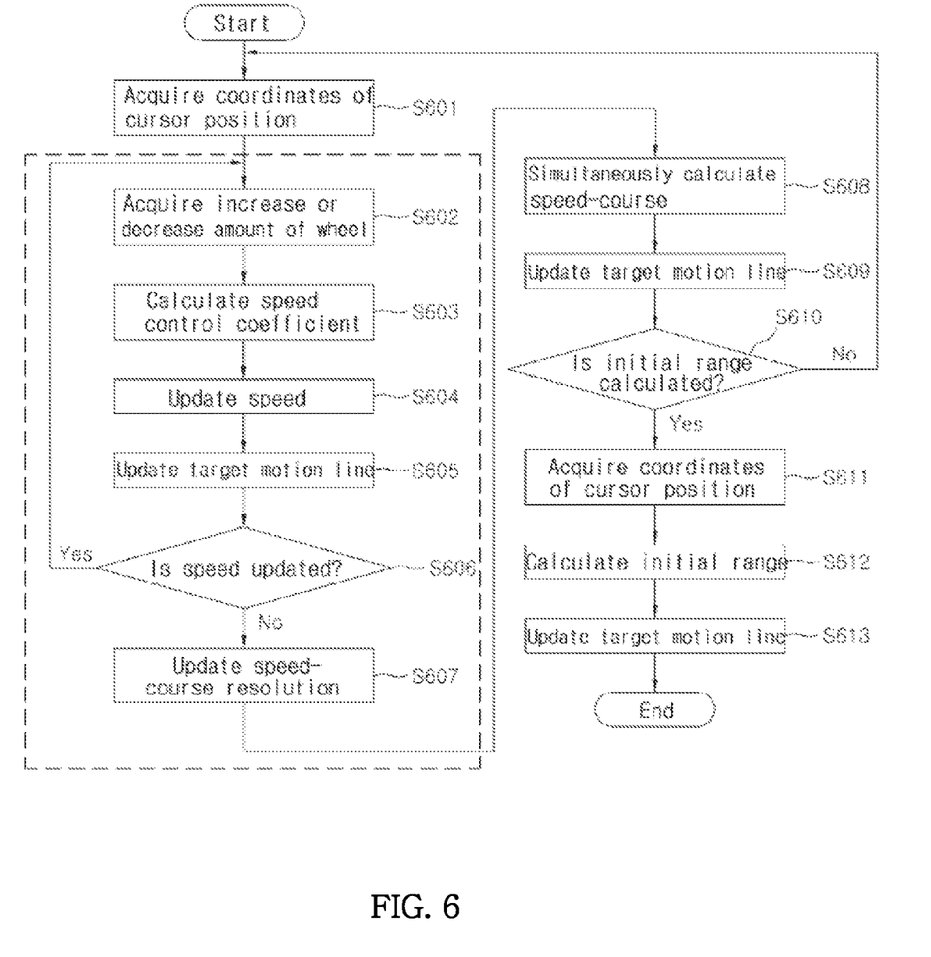
FIG. 6 is a flowchart illustrating the processing procedure of a user-interface target motion analysis system according to a method of simultaneously calculating a speed and a course through speed zooming. according to the present invention

The procedure of the user-interface target motion analysis according to a method of simultaneously inputting the speed and the course through speed zooming is processed as shown in FIG. 6.

Method (c) of simultaneously calculating a speed and a course through speed zooming includes the steps of (c1) acquiring the coordinates of the current position of the cursor operated by user's handling; (c2) acquiring an increase or decrease amount (an increase value or a decrease value) of the wheel operated by user's handling; (c3) calculating a speed control coefficient from the increase or decrease amount of the wheel; (c4) updating the speed using the speed control coefficient, the coordinates of the cursor position, and the coordinates of the initial range; (c5) updating a target motion line using the updated speed, the coordinates of the cursor position, and the coordinates of the initial range; (c6) determining whether or not speed update is additionally required; (c7) simultaneously calculating expected speed and course of a target by calculating a range and an angle from the coordinates of the current cursor position and the coordinates of the initial range of the target based on newly updated resolution of speed and course; (c8) updating the target motion line using the calculated speed and course; and (c9) calculating the initial range using the coordinates of the new cursor position and the target motion line.

Step (c9) of calculating the initial range includes the steps of (c9-1) calculating the coordinates of the initial range from the coordinates of the new cursor position and the target motion line; (c9-2) updating the target motion line using the coordinates of the cursor position and the coordinates of the initial range; and (c9-3) storing the initial range calculated from the coordinates of the cursor position.

If the user moves the cursor on the display screen using a pointing device such as a mouse, a joy stick or a track ball, an X coordinate value $X_c$ and a Y coordinate value $Y_c$ where the cursor is positioned are acquired S601.

The user acquires the increase or decrease amount (an increase value or a decrease value) of the wheel $\Delta_w$ while moving the wheel on the display screen using the pointing device such as a mouse or a track ball S602.

A speed control coefficient $C_v$ is calculated from the increase or decrease amount of the wheel $\Delta_w$ S603.

$$C_v = C_v + \Delta_w$$

The speed $V_c$ at the current cursor position is updated using the speed control coefficient $C_v$ calculated from the increase or decrease amount of the wheel $\Delta_w$, the coordinates of the cursor position $X_c$ and $Y_c$, and the coordinates of the initial range $X_b$ and $Y_b$ S604.

$$V_n = \frac{V_c}{C_v}$$

$$V_c = \sqrt{(X_c - X_b)^2 + (Y_c - Y_b)^2}$$

The target motion line is updated using the newly updated speed $V_n$, the coordinates of the cursor position $X_c$ and $Y_c$, and the coordinates of the initial range $X_b$ and $Y_b$ S605.

It is determined whether or not speed update is additionally required S606.

The speed $V_{est}$ and the course $C_{est}$ are simultaneously calculated from the coordinates of the cursor position $X_c$ and $Y_c$ and the coordinates of the initial range $X_b$ and $Y_b$ based on the newly updated resolution S607 of speed and course S608.

Since the coordinates of the cursor position $X_c$ and $Y_c$ contain two-dimensional information of X and Y coordinate values, the range and the angle between the coordinates of the cursor position $X_c$ and $Y_c$ and the coordinates of the initial range $X_b$ and $Y_b$ can be simultaneously calculated. The speed $V_{est}$ and the course $C_{est}$ can be calculated from the range and the angle. The range $D_{cb}$ between the coordinates of the cursor position $X_c$ and $Y_c$ and the coordinates of the initial range $X_b$ and $Y_b$ is calculated as shown below.

$$D_{cb} = \sqrt{(X_c - X_b)^2 + (Y_c - Y_b)^2}$$

Therefore, speed $V_{est}$ is as show below.

$$V_{est} = D_{cb}$$

The angle $A_{cb}$ between the coordinates of the cursor position $X_c$ and $Y_c$ and the coordinates of the initial range $X_b$ and $Y_b$ is calculated as shown below.

$$A_{cb} = \tan^{-1}\left(\frac{X_c - X_b}{Y_c - Y_b}\right)$$

Therefore, course $C_{est}$ is calculated as show below.

$$C_{est} = A_{cb}, \text{ (where, if } A_{cb} < 0, A_{cb} = A_{cb} + 360°)$$

Subsequently, a target motion line can be obtained from the coordinates of the cursor position $X_c$ and $Y_c$ and the coordinates of the initial range $X_b$ and $Y_b$, and it has a structure of a linear equation shown below S609.

$$y = S_t x + K_t$$

Together with the target motion line, the speed $V_{est}$ and the course $C_{est}$ calculated from the coordinates of the cursor position $X_c$ and $Y_c$ are stored.

It is determined whether or not an initial range needs to be calculated. That is, since the system requires three parameter values, it is determined whether or not a current initial range needs to be calculated S610.

If the initial range needs to be calculated, an X coordinate value $X_c$ and a Y coordinate value $Y_c$ where the cursor is positioned are acquired in order to calculate the initial range $R^0_{est}$ from the cursor position, like in the procedure of calculating a speed and a course described above S611.

The coordinates of the initial range $R^0_{est}$ are calculated from the acquired coordinates of the cursor position $X_c$ and $Y_c$ and the target motion line $y = S_t x + K_t$ obtained above S612.

Subsequently, the target motion line is updated from the coordinates of the cursor position $X_c$ and $Y_c$ and the coordinates of the initial range $X_b$ and $Y_b$, and the target motion line is updated from the coordinates of the cursor position $X_c$ and $Y_c$ and the coordinates of the initial range $X_b$ and $Y_b$ as shown below S613.

$$y=S'_t x+K'_t$$

Together with the target motion line, the initial range $R^0{}_{est}$ calculated from the coordinates of the cursor position $X_c$ and $Y_c$ is stored.

Figure 7:
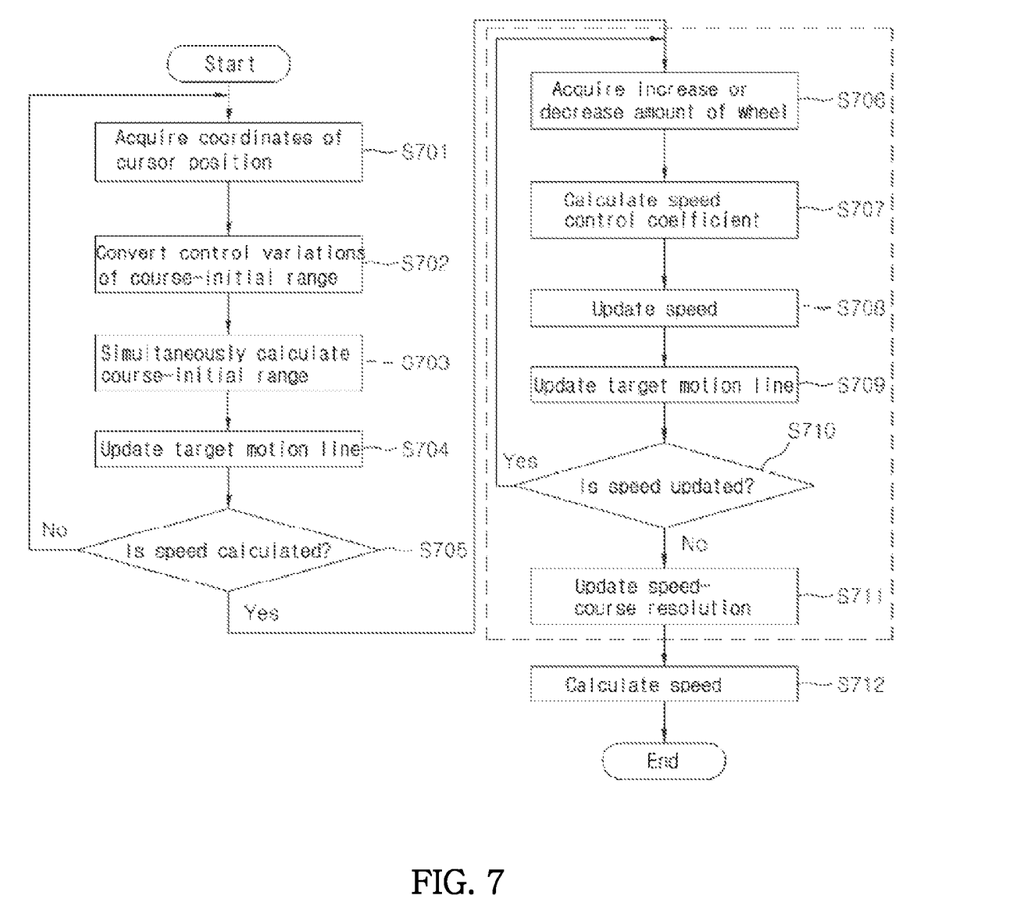
FIG. 7 is a flowchart illustrating the processing procedure of a user-interface target motion analysis system according to a method of simultaneously calculating a course and an initial range and zooming speed according to the present invention.

The procedure of the user-interface target motion analysis according to a method of simultaneously inputting a course and an initial range and a method of zooming speed is processed as shown in FIG. 7.

Method (d) of simultaneously calculating a course and an initial range and calculating a speed through speed zooming includes the steps of (d1) acquiring the coordinates of the current position of the cursor operated by user's handling; (d2) converting control variations of the course and the initial range using the relation between the moving direction of the cursor operated by user's handling and the bearing line; (d3) simultaneously calculating the course and the initial range from the control variations of the course and the initial range; (d4) updating the target motion line using the calculated course and initial range; (d5) acquiring an increase or decrease amount (an increase value or a decrease value) of the wheel operated by user's handling; (d6) calculating a speed control coefficient from the increase or decrease amount of the wheel; (d7) updating the speed using the speed control coefficient, the coordinates of the cursor position, and the coordinates of the initial range; (d8) updating the target motion line using the updated speed, the coordinates of the cursor position, and the coordinates of the initial range; (d9) determining whether or not speed update is additionally required; and (d10) calculating an expected speed of the target by calculating the range from the coordinates of the current cursor position and the coordinates of the initial range of the target based on newly updated resolution of speed.

If the user moves the cursor on the display screen using a pointing device such as a mouse or a track ball, an X coordinate value $X_c$ and a Y coordinate value $Y_c$ where the cursor is positioned are acquired S701.

After acquiring the coordinates of the cursor position, a course control variation $\Delta C_{est}$ and an initial range control variation $\Delta R^0{}_{est}$ are calculated using the relation between the moving direction of the cursor operated by user's handling and an bearing line S702. The course control variation $\Delta C_{est}$ and the initial range control variation $\Delta R^0{}_{est}$ are calculated along the first bearing line among the bearing lines as shown below, depending on the direction of the cursor $\Delta X_c$ and $\Delta Y_c$ moving from the coordinates of the past cursor position to the coordinates of the current cursor position.

$$\Delta C_{est} \propto \pm \Delta X_c, \Delta R_{est}{}^0 \propto \pm \Delta Y_c$$

The course control variation $\Delta C_{est}$ and the initial range control variation $\Delta R^0{}_{est}$ may also be calculated along the first bearing line among the bearing lines as shown below, depending on the direction of the cursor $\Delta X_c$ and $\Delta Y_c$ moving from the coordinates of the past cursor position to the coordinates of the current cursor position.

$$\Delta C_{est} \propto \pm \Delta Y_c, \Delta_{est}{}^0 \propto \pm \Delta X_c$$

The step of simultaneously calculating the course and the initial range S703 is a step of simultaneously calculating a course $C_{est}$ and an initial range $R^0{}_{est}$ from the coordinates of the cursor position $X_c$ and $Y_c$, the course control variation $\Delta C_{est}$, and the initial range control variation $\Delta R^0{}_{est}$. The course $C_{est}$ and the initial range $R^0{}_{est}$ may be simultaneously obtained from the course control variation $\Delta C_{est}$ and the initial range control variation $\Delta R^0{}_{est}$ calculated based on the direction of the cursor $\Delta X_c$ and $\Delta Y_c$ moving from the coordinates of the past cursor position to the coordinates of the current cursor position. The course $C_{est}$ and the initial range $R^0{}_{est}$ are given as shown below.

$$C_{est}=C_{est}+\Delta C_{est} \text{ for } \Delta C_{est} \propto \pm \Delta X_c$$

$$R_{est}{}^0=R_{est}{}^0+\Delta R_{est}{}^0 \text{ for } \Delta R_{est}{}^0 \propto \pm \Delta Y_c$$

The course $C_{est}$ and the initial range $R^0{}_{est}$ may also be given as shown below along the first bearing line among the bearing lines.

$$C_{est}=C_{est}+\Delta C_{est} \text{ for } \Delta C_{est} \propto \pm \Delta Y_c$$

$$R_{est}{}^0=R_{est}{}^0+\Delta R_{est}{}^0 \text{ for } \Delta R_{est}{}^0 \propto \pm \Delta X_c$$

The target motion line is updated from the calculated course $C_{est}$ and initial range $R^0{}_{est}$, the coordinates of the cursor position $X_c$ and $Y_c$, and the coordinates of the initial range $X_b$ and $Y_b$ S704. The target motion line can be obtained from the coordinates of the cursor position $X_c$ and $Y_c$ and the coordinates of the initial range $X_b$ and $Y_b$, and it has a structure of a linear equation shown below.

$$y=S_t x+K_t$$

Together with the target motion line, the course $C_{est}$ and the initial range $R^0{}_{est}$ calculated from the coordinates of the cursor position $X_c$ and $Y_c$ are stored.

The step of determining calculation of the speed S705 is a step of determining whether or not calculation of speed $V_{est}$ is needed.

If calculation of the speed $V_{est}$ is needed, the user acquires an increase or decrease amount (an increase value or a decrease value) of a wheel $\Delta_w$ while moving the wheel on the display screen using a pointing device such as a mouse or a track ball S706.

A speed control coefficient $C_v$ is calculated from the increase or decrease amount of the wheel $\Delta_w$ S707.

$$C_v=C_v+\Delta_w$$

The speed $V_c$ at the current cursor position is updated using the speed control coefficient $C_v$ calculated from the increase or decrease amount of the wheel $\Delta_w$, the coordinates of the cursor position $X_c$ and $Y_c$, and the coordinates of the initial range $X_b$ and $Y_b$ S708.

$$V_c = \frac{V_c}{C_v}$$

$$V_c = \sqrt{(X_c - X_b)^2 + (Y_c - Y_b)^2}$$

The target motion line is updated using the newly updated speed $V_n$, the coordinates of the cursor position $X_c$ and $Y_c$, and the coordinates of the initial range $X_b$ and $Y_b$ S709.

It is determined whether or not speed update is additionally required S710.

The speed $V_{est}$ is calculated based on the newly updated resolution of speed S711. The range $D_{cb}$ between the coordinates of the cursor position $X_c$ and $Y_c$ and the coordinates of the initial range $X_b$ and $Y_b$ is calculated as shown below.

$$D_{cb} = \sqrt{(X_c - X_b)^2 + (Y_c - Y_b)^2}$$

Therefore, speed $V_{est}$ is calculated as show below.

$$V_{est} = D_{cb}$$

Figure 8:
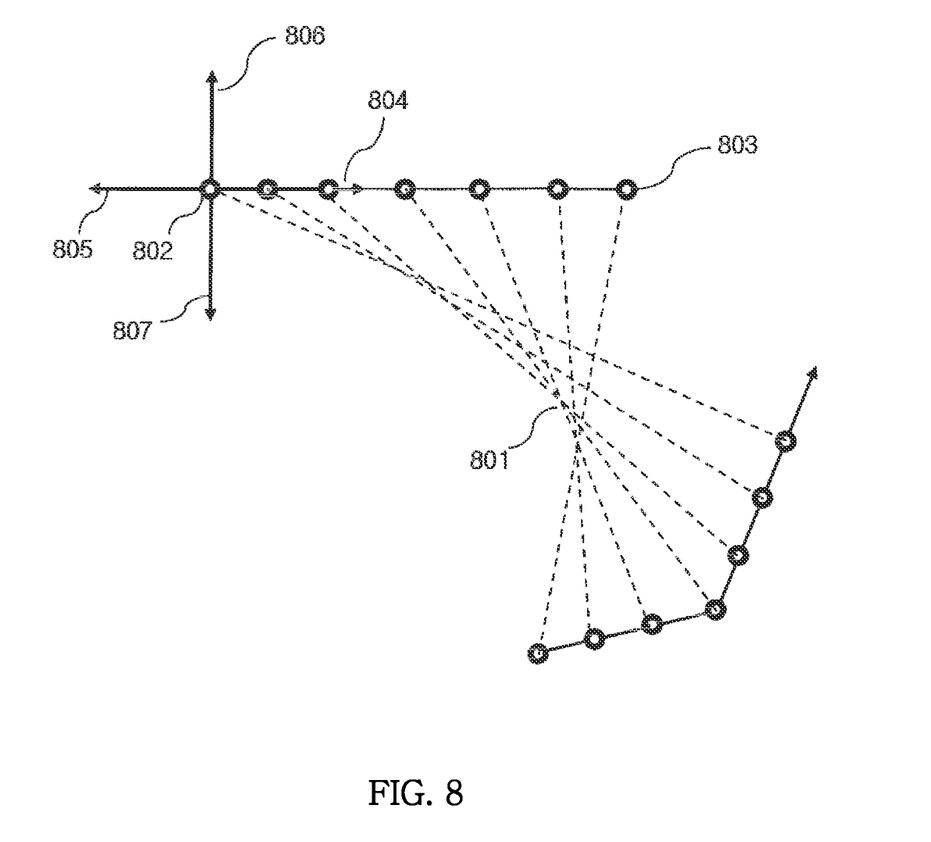
FIG. 8 is a view showing the concept of simultaneously calculating a course and an initial range according to the present invention.

The conceptual view of a method of simultaneously calculating a course and an initial range is as shown in FIG. 8.

For a series of bearing lines 801, if the cursor moves in the X-axis direction 804 and 805 with respect to the current cursor position 803 and the initial range position 803, a course control variation $\Delta C_{est}$ is obtained depending on the moving direction $\Delta X_c$ of the cursor, and if the cursor moves in the Y-axis direction 806 and 807, an initial range control variation $\Delta R^0_{est}$ is obtained depending on the moving direction $\Delta Y_c$ of the cursor. If the cursor moves in the X-axis direction 804 and 805 along the first bearing line among the bearing lines, the initial range control variation $\Delta R^0_{est}$ is obtained depending on the moving direction $\Delta X_c$ of the cursor, and if the cursor moves in the Y-axis direction 806 and 807, the course control variation $\Delta C_{est}$ is obtained depending on the moving direction $\Delta Y_c$ of the cursor.

Figure 9:
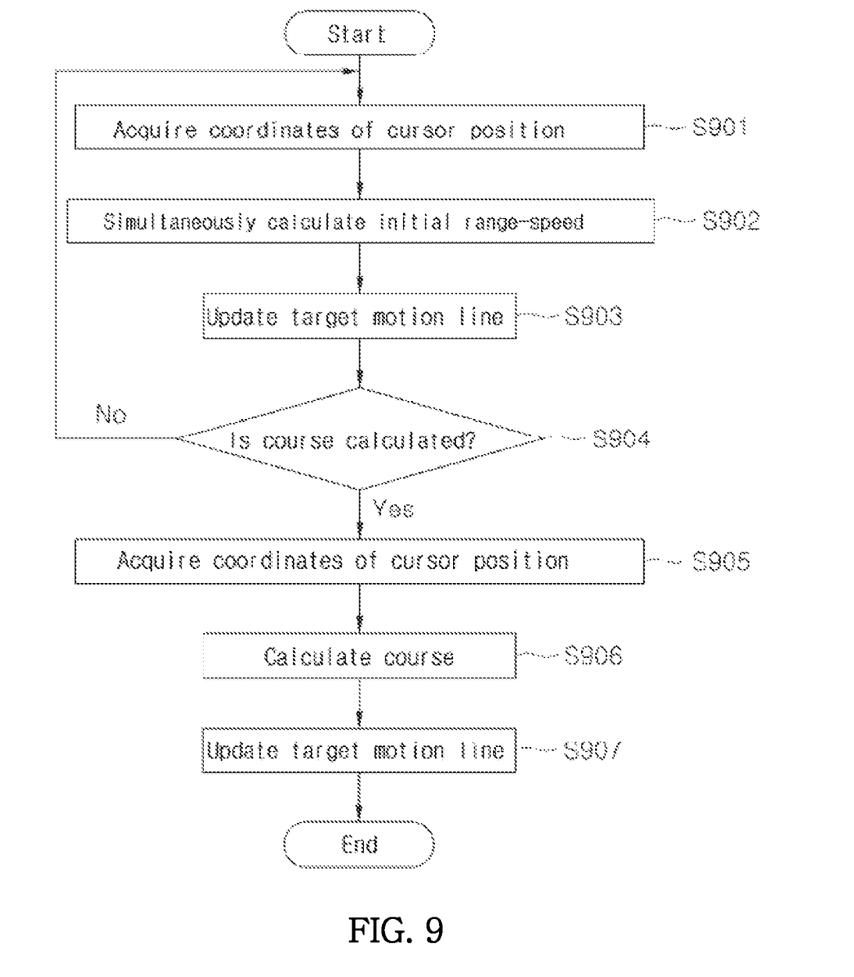
FIG. 9 is a flowchart illustrating the processing procedure of a user-interface target motion analysis system according to a method of simultaneously calculating an initial range and a speed according to the present invention.

The procedure of the user-interface target motion analysis according to a method of simultaneously inputting the initial range and the speed is processed as shown in FIG. 9. Method (e) of simultaneously calculating an initial range and a speed includes the steps of (e1) acquiring the coordinates of the current position of the cursor operated by user's handling; (e2) simultaneously calculating the initial range and the speed using X-axis and Y-axis coordinate values of the coordinates of the current cursor position; (e3) updating a target motion line using the calculated initial range and speed; and (e4) calculating the course using the coordinates of a new cursor position and the target motion line.

Step (e4) of calculating a course includes the steps of (e4-1) acquiring X-axis and Y-axis coordinate values of the coordinates of the new cursor position; and (e4-2) calculating the course using the coordinates of the cursor position and the coordinates of the initial range.

If the user moves the cursor on the display screen using a pointing device such as a mouse or a track ball, an X coordinate value $X_c$ and a Y coordinate value $Y_c$ where the cursor is positioned are acquired S901.

The initial range $R^0_{est}$ and the speed $V_{est}$ are simultaneously calculated using the acquired coordinates of the cursor position $X_c$ and $Y_c$.

Since the coordinates of the cursor position $X_c$ and $Y_c$ contain two-dimensional information of X and Y coordinate values, the initial range $R^0_{est}$ and the speed $V_{est}$ may be simultaneously obtained using the X and Y coordinate values of the coordinates of the cursor position. The initial range $R^0_{est}$ and the speed $V_{est}$ are given as shown below.

The range between the coordinates of the cursor position $X_c$ and $Y_c$ and the origin point (0,0) is calculated as shown below.

$$D_r = \sqrt{X_c^2 + Y_c^2}$$

Therefore, initial range $R^0_{est}$ is as shown below.

$$R^0_{est} = D_r$$

The range between the coordinates of the cursor position $X_c$ and $Y_c$ and the coordinates of the initial range $X_b$ and $Y_b$ is calculated as shown below.

$$D_v = \sqrt{(X_c - X_b)^2 + (Y_c - Y_b)^2}$$

Therefore, speed $V_{est}$ is as shown below.

$$V_{est} = D_v$$

The target motion line is updated from the initial range $R^0_{est}$ and the speed $V_{est}$, the coordinates of the cursor position $X_c$ and $Y_c$, and the coordinates of the initial range $X_b$ and $Y_b$ S903. The target motion line can be obtained from the coordinates of the cursor position $X_c$ and $Y_c$ and the coordinates of the initial range $X_b$ and $Y_b$, and it has a structure of a linear equation shown below.

$$y = S_t x + K_t$$

Together with the target motion line, the initial range $R^0_{est}$ and the speed $V_{est}$ calculated from the coordinates of the cursor position $X_c$ and $Y_c$ are stored.

The step of determining calculation of a course S904 is a step of determining calculation of course $C_{est}$.

An X coordinate value $X_c$ and a Y coordinate value $Y_c$ where the cursor is positioned are acquired in order to calculate the course $C_{est}$ with respect to the cursor position.

The course $C_{est}$ is calculated from the coordinates of the cursor position $X_c$ and $Y_c$ and the coordinates of the initial range $X_b$ and $Y_b$ S906.

The angle $A_{cb}$ between the coordinates of the cursor position and the coordinates of the initial range is calculated as shown below.

$$A_{cb} = \tan^{-1}\left(\frac{X_c - X_b}{Y_c - Y_b}\right)$$

Therefore, course $C_{est}$ is as shown below.

$$C_{est} = A_{cb}, \text{ (where, if } A_{cb} < 0, A_{cb} = A_{cb} + 360°\text{)}$$

The target motion line is updated from the course $C_{est}$, the coordinates of the cursor position $X_c$ and $Y_c$ and the coordinates of the initial range $X_b$ and $Y_b$ S907. The target motion line is updated from the coordinates of the cursor position $X_c$ and $Y_c$ and the coordinates of the initial range $X_b$ and $Y_b$ as shown below.

$$y = S'_t x + K'_t$$

Together with the target motion line, the course $C_{est}$ calculated from the coordinates of the cursor position $X_c$ and $Y_c$ is stored.

The effects described below can be expected from the user-interface target motion analysis method and the target motion analysis system according to the present invention.

First, the time required for the target motion analysis can be reduced by simultaneously inputting a speed and a course, a course and an initial range, or an initial range and a speed.

Second, the operating method is simpler than a conventional technique such as the keyboard input method or the slide button input method.

Third, operability of the target motion analysis may be improved.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A user-interface target motion analysis method using two-dimensional parameter control, the method comprising:

(a1) a first step of displaying a user-interface target motion analysis (TMA) screen capable of selecting an input method;

(a2) a second step of receiving an input method selection signal of a user;

(a3) a third step of precisely calculating a speed and a course by controlling resolution of speed and course through speed zooming, controlling increment of the speed and course using information on a cursor position and a wheel operated by the user's handling, based on the user-selected input method, and recognizing and storing the speed and the course as input values;

(a4) a fourth step of simultaneously calculating at least two parameters among parameter values including an initial range, a speed and a course based on the user-selected input method, and recognizing and storing the parameters as input values;

(a5) a fifth step of calculating other parameter values that are not calculated in the fourth step, and recognizing and storing the other parameters as input values; and (a6) a sixth step of generating a result of the target motion analysis using the parameters inputted through the third to fifth steps.

2. The method according to claim 1, wherein the input method is generated by selecting any one of (b) a method of zooming speed, (c) a method of simultaneously calculating a speed and a course through speed zooming, (d) a method of simultaneously calculating a course and an initial range and calculating a speed through speed zooming.

3. The method according to claim 2, wherein method (b) of zooming speed includes the steps of:

(b1) acquiring an increase or decrease amount (an increase value or a decrease value) of a wheel operated by user's handling;

(b2) calculating a speed control coefficient from the increase or decrease amount of the wheel;

(b3) updating the speed using the speed control coefficient, coordinates of a cursor position, and coordinates of the initial range;

(b4) updating a target motion line using the updated speed, the coordinates of the cursor position, and the coordinates of the initial range; and (b5) determining whether or not speed update is additionally required.

4. The method according to claim 2, wherein method (c) of simultaneously calculating a speed and a course through speed zooming includes the steps of:

(c1) acquiring coordinates of a current position of a cursor operated by user's handling;

(c2) acquiring an increase or decrease amount (an increase value or a decrease value) of a wheel operated by user's handling;

(c3) calculating a speed control coefficient from the increase or decrease amount of the wheel;

(c4) updating the speed using the speed control coefficient, the coordinates of the cursor position, and the coordinates of the initial range;

(c5) updating a target motion line using the updated speed, the coordinates of the cursor position, and the coordinates of the initial range;

(c6) determining whether or not speed update is additionally required;

(c7) simultaneously calculating expected speed and course of a target by calculating a range and an angle from the coordinates of the current cursor position and the coordinates of the initial range of the target based on newly updated resolution of speed and course;

(c8) updating the target motion line using the calculated speed and course; and (c9) calculating the initial range using the coordinates of a new cursor position and the target motion line.

5. The method according to claim 2, wherein method (d) of simultaneously calculating a course and an initial range and calculating a speed through speed zooming includes the steps of:

(d1) acquiring coordinates of a current position of a cursor operated by user's handling;

(d2) converting control variations of the course and the initial range using a relation between a moving direction of the cursor operated by user's handling and a bearing line;

(d3) simultaneously calculating the course and the initial range from the control variations of the course and the initial range;

(d4) updating a target motion line using the calculated course and initial range;

(d5) acquiring an increase or decrease amount (an increase value or a decrease value) of a wheel operated by user's handling;

(d6) calculating a speed control coefficient from the increase or decrease amount of the wheel (d7) updating the speed using the speed control coefficient, the coordinates of the cursor position, and coordinates of the initial range;

(d8) updating the target motion line using the updated speed, the coordinates of the cursor position, and the coordinates of the initial range;

(d9) determining whether or not speed update is additionally required; and (d10) calculating an expected speed of a target by calculating a range from the coordinates of the current cursor position and the coordinates of the initial range of the target based on newly updated resolution of speed.

6. The method according to claim 1, wherein the third step precisely calculates the speed and the course by controlling the resolution of speed and course through speed zooming using wheel information.

7. The method according to claim 1, wherein the fourth step simultaneously calculates the speed and the course through speed zooming using information on a cursor position and a wheel, simultaneously calculates the course and the initial range from a relation between a moving direction of the cursor operated by user's handling and a bearing line.

* * * * *